Nov. 3, 1964  E. P. BUSILLO  3,154,945
FLOWMETER
Filed May 26, 1961
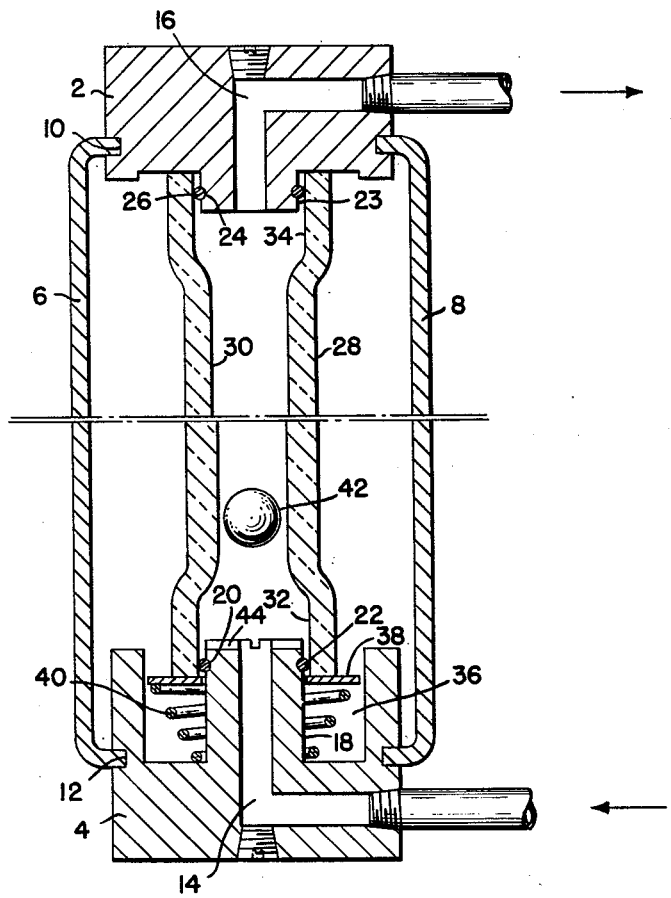
INVENTOR.
EUGENE P. BUSILLO
BY
ATTORNEYS

United States Patent Office 3,154,945
Patented Nov. 3, 1964

3,154,945
FLOWMETER
Eugene P. Busillo, Huntingdon Valley, Pa., assignor to Fischer & Porter Company, Warminster, Pa., a corporation of Pennsylvania
Filed May 26, 1961, Ser. No. 112,845
4 Claims. (Cl. 73—209)

This invention relates to flowmeters of the variable area type, and particularly to the mounting of replaceable tubes therein.

As disclosed in my application Serial No. 737,324, filed May 23, 1958 now patent No. 3,060,738, provision may be made for mounting variable area flowmeter tubes within a mounting frame so that they may be readily replaced in case of breakage or so that they may be replaced by tubes having different variable area characteristics. In accordance with my prior application, a rather complicated arrangement was provided involving adaptors arranged to be sealed both to the flow tube and to fixed members of the frame providing passages for the flow. Further, in accordance with said application, a spring utilized to maintain assembly was exposed to the flowing fluid.

It is the general object of the present invention to provide a flowmeter of much simpler construction but which has, nevertheless, the advantageous aspect of providing for ready replacement of a flow tube, the construction having the further advantage that there is no exposure of a spring to the flowing fluid. This last is important since the materials desirably used for springs are generally subject to corrosion by many of the fluids subject to flow measurement.

The foregoing general objects, as well as those relating to details of construction and operation, will become apparent from the following description, read in conjunction with the accompanying drawing, in which the single figure is a vertical section showing the construction of a preferred embodiment of the invention.

Upper and lower connecting members 2 and 4 are mounted in fixed axial relationship with each other by means of a frame which may take any desirable form and is conventionalized for illustrative purposes as comprising a pair of members 6 and 8 which may be snapped into grooves 10 and 12 in the members 2 and 4 to provide axial alignment and definite relationship of the latter. Additional plates may be secured thereto to enclose and protect the flow tube, there usually being provided a window arrangement for ready reading, although it will be recognized that the invention is applicable to a flowmeter in which a float is magnetically followed by an indicating means or wherein indications are achieved through the use of a rod extension from the float, or the like.

Inlet and outlet fluid passages are indicated respectively at 14 and 16, and provisions may be made for lateral or axial pipe connections thereto. The lower member 4 is provided with a cylindrical portion 18 through which the flow passage 14 extends concentrically. At its upper end the portion 18 is provided with an externally facing grove 20 in which an O-ring 22 may be located. In similar fashion the upper member 2 is provided with a cylindrical portion 23 circumferentially slotted at 24 to receive an O-ring 26.

The variable area flowmeter tube 28, generally desirably formed of glass and having the usual tapered bore 30, is provided with enlargements at 32 and 34 which embrace the O-rings 22 and 26 to provide fluid-tight seals. The inner diameters of the portions 32 and 34 of the tube are desirably equal so that irrespective of possible high pressures of the fluid undergoing measurement there will be no substantial force tending to move the tube 28 in either direction. It may, furthermore, be here noted that the socket portions 32 and 34 of the tube may be standard for a wide variety of tubes having different tapers of their bores. The tubes 28, if of glass, may be molded on two-part mandrels to provide interior precision. As will be seen from the construction, precision of external dimensions of the tube is immaterial.

Within an annular socket 36 in the lower member 4 there is housed a washer 38 loosely surrounding the portion 18 and urged upwardly by a spring 40 seated at the lower portion of the socket. Desirably this spring is of the conical shape illustrated to provide for centering thereof and at the same time lateral flexibility to facilitate removal and replacement of tubes. The washer 38, in view of its minor function, may be replaced by a smaller diameter continuation of the upper end of the spring 40.

To complete the showing there is illustrated at 42 a float which may take any desired form but it shown as a sphere as is useful particularly in quite small instruments. Grooves 42 at the upper end of the portion 18 prevent closing off of the lower flow passage by the seating of the ball which is variably carried upwardly to positions within the tube 28 corresponding to rates of flow.

The members 2 and 4 may be of suitable material for the the fluilds undergoing measurement, such as stainless steel. However, the washer 38 and spring 40 may be of other materials, and in particular the spring 40 may be formed of a metal which might corrode under many circumstances. When the assembly is complete, as illustrated, it will be evident that the spring and washer are completely isolated from the flowing fluid due to the sealing action of the O-rings on the precision bores of the tube portions 32 and 34.

When it is desired to remove a tube it is only necessary to press it down manually until its upper end clears the O-ring 26 and the lower end of the portion 23 of member 2. The tube may then be rocked laterally as permitted by the resilience of the O-ring 22 and tilting of the washer 38 and spring 40, the tilting of the latter freely occurring because of its conical configuration. By then lifting the tube it may be removed from the O-ring 22. The O-ring 22 acts as a stop to prevent loss of the washer 38 by limiting its upward movement under the action of the spring. It may be noted that the spring may be a relatively weak one so that the O-ring 22 will form an effective stop. The spring is not required to perform any sealing function under pressure since the sealing is accomplished by the O-rings with elimination of any forces tending to move the tube 28 under the action of fluid pressure due to the equal diameters of the portions 32 and 34 as mentioned above. The sole function of the spring 40, accordingly, is to prevent dropping of the tube by balancing its weight, the spring pressing the tube only relatively lightly axially against the member 2.

Replacement or substitution of a tube is effected by a reverse sequence of events corresponding to those involved in removal. Removal and replacement are, accordingly, only matters of a few seconds.

It will be noted that when the tube is removed there is no danger of losing any of the parts by dropping them from the meter, even the O-rings being quite securely held in the annular grooves.

It will be evident that various alternative arrangements may be utilized, the most obvious being that of inversion from top to bottom of the elements. Various other changes in details may be made without departing from the invention as defined in the following claims.

What is claimed is:

1. A flowmeter comprising a pair of mounting members having portions extending towards each other provided with flow passages, annular packing rings located in external grooves in said portions of the mounting members, a metering tube having end portions arranged to surround and seal against said annular packing rings, a spring surrounding said portion of one of the mounting members axially beyond the corresponding end of the tube and reacting between the last mentioned member and the adjacent end of the tube to urge it towards the other mounting member, and a washer located between said spring and the adjacent end of the tube, said washer having a loose fit on the mounting member portion surrounded by said spring but having an opening sufficiently small not to clear the adjacent annular packing ring.

2. A flowmeter comprising a pair of mounting members having portions extending towards each other provided with flow passages, annular packing rings located in external grooves in said portions of the mounting members, a metering tube having end portions arranged to surround and seal against said annular packing rings, and a conical spring surrounding said portion of one of the mounting members axially beyond the corresponding end of the tube and reacting between the last mentioned member and the adjacent end of the tube to urge it towards the other mounting member, said conical spring having its larger end adjacent to the tube.

3. A flowmeter comprising a pair of mounting members having portions extending towards each other provided with flow passages, annular packing rings located in external grooves in said portions of the mounting members, a metering tube having end portions arranged to surround and seal against said annular packing rings, and a spring surrounding said portion of one of the mounting members axially beyond the corresponding end of the tube and reacting between the last mentioned member and the adjacent end of the tube to urge it towards the other mounting member, the end portions of the metering tube having substantially equal diameter bores sealing against said annular packing rings.

4. A flowmeter comprising a pair of mounting members having portions extending towards each other provided with flow passages, annular packing rings located in external grooves in said portions of the mounting members, a metering tube having end portions arranged to surround and seal against said annular packing rings, and a spring surrounding said portion of one of the mounting members axially beyond the corresponding end of the tube and reacting between the last mentioned member and the adjacent end of the tube to urge it towards the other mounting member, the end portions of the metering tube providing sockets having substantially equal diameter bores sealing against said annular packing rings.

References Cited in the file of this patent

UNITED STATES PATENTS 49,366     Belfield _____ Aug. 15, 1865

FOREIGN PATENTS 1,208,989    France _____ Sept. 14, 1959